United States Patent
Eom et al.

(10) Patent No.: US 10,802,043 B2
(45) Date of Patent: Oct. 13, 2020

(54) METHOD FOR SENSING EXTERNAL SHOCK AND ELECTRONIC DEVICE THEREFOR

(71) Applicant: Samsung Electronics Co., Ltd., Gyeonggi-do (KR)

(72) Inventors: Kihun Eom, Gyeonggi-do (KR); Kihoon Kang, Gyeonggi-do (KR); Taekeun Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 16/685,449

(22) Filed: Nov. 15, 2019

(65) Prior Publication Data
US 2020/0158752 A1    May 21, 2020

(30) Foreign Application Priority Data
Nov. 15, 2018  (KR) .......................... 10-2018-0140737

(51) Int. Cl.
| | | |
|---|---|---|
| H04M 1/725 | (2006.01) | |
| G01P 15/18 | (2013.01) | |
| G01P 15/08 | (2006.01) | |

(52) U.S. Cl.
CPC .............. *G01P 15/18* (2013.01); *G01P 15/08* (2013.01); *H04M 1/72519* (2013.01); *H04M 2250/12* (2013.01)

(58) Field of Classification Search
CPC .... H04M 1/24; H04M 1/725; H04M 1/72519; G01P 15/08; G06F 1/1864; G08B 25/08; G08B 25/10; G08B 21/18; H04W 12/06; H04W 88/02
See application file for complete search history.

(56) References Cited

U.S. PATENT DOCUMENTS

| | | | |
|---|---|---|---|
| 7,930,081 B2 | 4/2011 | Kinouchi | |
| 2011/0053641 A1* | 3/2011 | Lee ........................ | G06F 1/1626 455/556.1 |
| 2012/0133218 A1 | 5/2012 | Fujii | |
| 2015/0017965 A1* | 1/2015 | Lim .................. | H04W 52/0258 455/418 |
| 2015/0054622 A1* | 2/2015 | Jun .................... | G06K 7/10356 340/10.1 |

(Continued)

FOREIGN PATENT DOCUMENTS

| | | |
|---|---|---|
| EP | 2 458 832 | 5/2012 |
| JP | 2005-244892 | 9/2005 |

(Continued)

OTHER PUBLICATIONS

International Search Report dated Mar. 6, 2020 issued in counterpart application No. PCT/KR2019/015670, 7 pages.

*Primary Examiner* — Thanh C Le
(74) *Attorney, Agent, or Firm* — The Farrell Law Firm, P.C.

(57) ABSTRACT

A method and an electronic device are provided for sensing an external shock applied to the electronic device. A method includes monitoring acceleration using a first sensor; generating an event based on the monitored acceleration; activating a second sensor based on the event; acquiring data due to external shocks on parts of the electronic device by using the activated second sensor; and storing the acquired data and information related to the external shocks.

20 Claims, 12 Drawing Sheets

(56) References Cited

U.S. PATENT DOCUMENTS

2015/0065079 A1    3/2015  Tomita et al.
2017/0313329 A1   11/2017  Peitz
2019/0325188 A1* 10/2019  Jo ........................ G06F 1/1684

FOREIGN PATENT DOCUMENTS

| JP | 4438733 | 3/2010 |
| JP | 2011-244387 | 12/2011 |
| JP | 2015-045898 | 3/2015 |
| KR | 1020110018031 | 2/2011 |
| KR | 1020140100294 | 8/2014 |

* cited by examiner

METHOD FOR SENSING EXTERNAL SHOCK AND ELECTRONIC DEVICE THEREFOR

CROSS-REFERENCE TO RELATED APPLICATION(S)

This application is based on and claims priority under 35 U.S.C. § 119 to Korean Patent Application No. 10-2018-0140737, filed on Nov. 15, 2018, in the Korean Intellectual Property Office, the entire disclosure of which is incorporated herein by reference.

BACKGROUND

1. Field

The disclosure relates generally to a method and an electronic device for sensing an external shock applied to the electronic device.

2. Description of Related Art

Electronic devices, such as smartphones, laptops, and tablets, which are commonly carried by users, are often exposed to external shocks and are vulnerable to shocks above certain intensity levels. In fact, personnel injuries may occur in extreme cases due to accidents, such as battery explosion caused by the shocks.

An electronic device may be mistakenly dropped by a user, or a user may habitually apply an impact to the electronic device. As described above, various types of shocks may be applied to an electronic device, and the applied shock may affect components of the electronic device.

An acceleration sensor may be used in an electronic device to recognize an external shock. The acceleration sensor may measure gravity acceleration applied to the electronic device. In general, a 3-axis acceleration sensor returns a magnitude of gravitational acceleration across each of x, y, and z axes. However, an acceleration sensor that is commonly included in an electronic device, such as a smart phone, is limited to measuring only up to 4G (4 gravitational acceleration, 1G=9.8 m/s$^2$).

Therefore, a study to use a separate shock sensor is in progress.

A shock sensor in the conventional art, however, has problems in that a process for outputting an analog signal and additionally performing signal processing is required, sampling of an analog signal by a signal processing process should operate at a speed of 13 kHz or higher, the current consumed by an electronic device is high, the size of the shock sensor is large, and the circuit configuration is complicated to implement. Therefore, it is difficult to apply the conventional shock sensor to a portable electronic device.

SUMMARY

Accordingly, the disclosure is designed to address at least the problems and/or disadvantages described above and to provide at least the advantages described below.

An aspect of the disclosure is to provide a shock sensor applicable to an electronic device, and provide a minimum function that the shock sensor is required to have and an operation scheme thereof.

Another aspect of the disclosure is to provide a method for sensing external shocks applied to an electronic device by using the proposed shock sensor, and an electronic device therefor.

Another aspect of the disclosure is to provide a method and an electronic device therefor that enable a shock sensor to be applied to a portable electronic device, in which application of the shock sensor was conventionally difficult, and therefore enable precise sensing of shocks.

Another aspect of the disclosure is to provide a method of sensing external shocks, determining the amount of the shocks, and displaying a shock state of the electronic device due to the external shocks to a user, such that the curiosity of a user can be satisfied, and time can be saved in a post service.

In accordance with an aspect of the disclosure, a method of an electronic device is provided, which includes monitoring acceleration using a first sensor; generating an event based on the monitored acceleration; activating a second sensor based on the event; acquiring data due to external shocks on parts of the electronic device by using the activated second sensor; and storing the acquired data and information related to the external shocks.

In accordance with another aspect of the disclosure, an electronic device is provided, which includes a first sensor located configured to monitor acceleration within a first range; a second sensor configured to measure acceleration within a second range that is higher than the first range; a processor operatively connected to the first sensor and the second sensor; and a memory operatively connected to the processor, wherein the first sensor is further configured to generate an event for activating the second sensor when a monitored acceleration is greater than or equal to a maximum of the first range, and wherein the memory is further configured to store information related to external shocks on parts of the housing, store instructions, which when executed, cause the processor to acquire data due to the external shocks by using the activated second sensor, and store the acquired data with the information related to the external shocks in the memory.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Various embodiments will be described in detail with reference to accompanying drawings. In the following description, specific details such as detailed configuration and components are merely provided to assist the overall understanding of these embodiments of the disclosure. Therefore, it should be apparent to those skilled in the art that various changes and modifications of the embodiments described herein can be made without departing from the scope and spirit of the disclosure. In addition, descriptions of well-known functions and constructions are omitted for clarity and conciseness.

Figure 1:
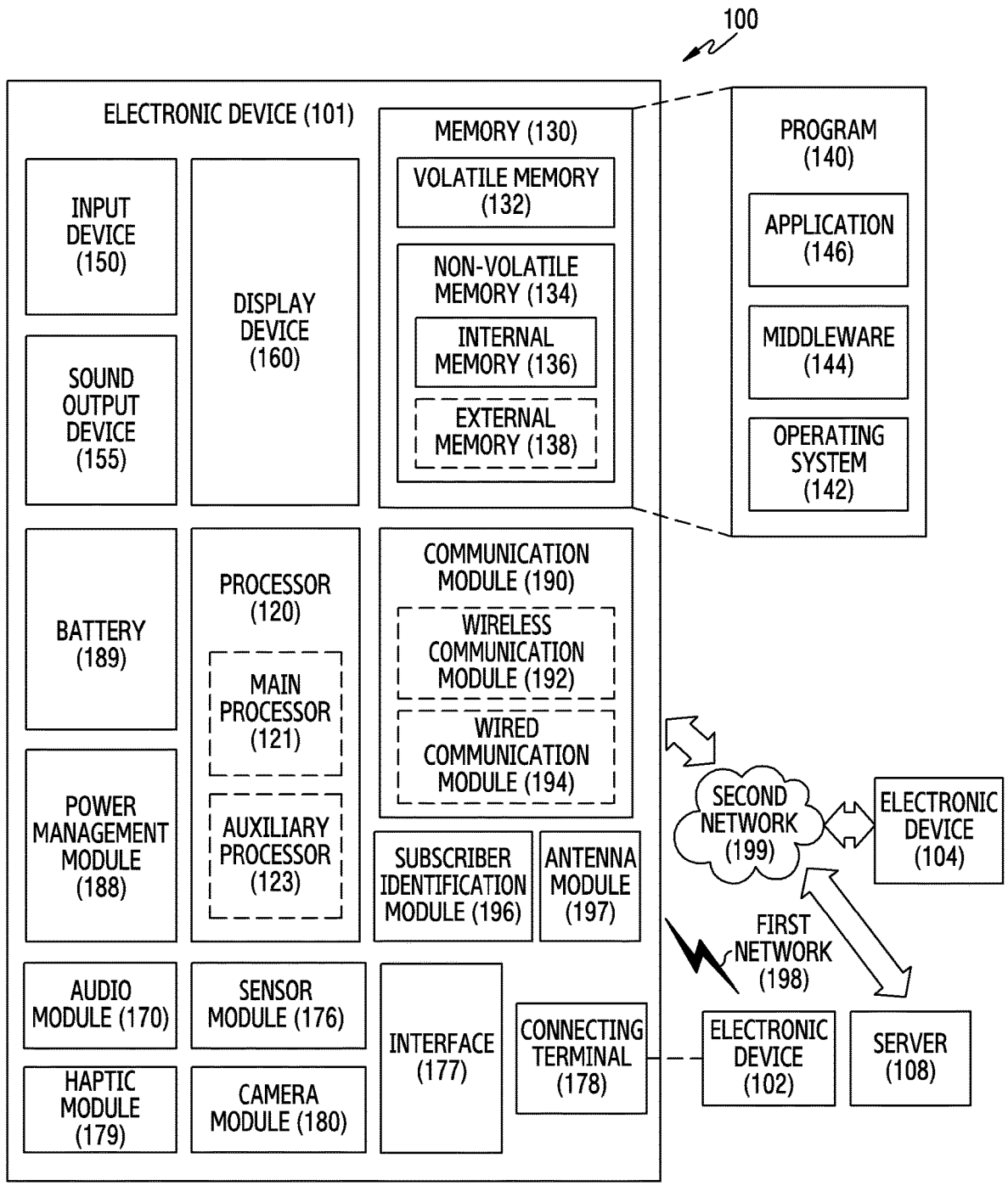
FIG. 1 illustrates an electronic device in a network environment according to an embodiment.

FIG. 1 illustrates an electronic device 101 in a network environment 100 according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108.

The electronic device 101 includes a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, and an antenna module 197. Alternatively, at least one (e.g., the display device 160 or the camera module 180) of the components may be omitted from the electronic device 101, or one or more other components may be added in the electronic device 101. Some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134.

The processor 120 includes a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include software and input data or output data for a command related thereto. The memory 130 includes the volatile memory 132 and/or the non-volatile memory 134.

The program 140 may be stored in the memory 130 as software, and includes an operating system (OS) 142, middleware 144, and an application 146.

The input device 150 may receive a command or data to be used by other component (e.g., the processor 120) of the electronic device 101, from the outside (e.g., a user) of the electronic device 101. The input device 150 may include a microphone, a mouse, a keyboard, or a digital pen (e.g., a stylus pen).

The sound output device 155 may output sound signals to the outside of the electronic device 101. The sound output device 155 may include a speaker or a receiver. The speaker may be used for general purposes, such as playing multimedia or playing record, and the receiver may be used for an incoming calls. The receiver may be implemented as separate from, or as part of the speaker.

The display device 160 may visually provide information to the outside of the electronic device 101. The display device 160 may include a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the sound output device 155 or a headphone of an external electronic device 102 directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, and/or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include a high definition multimedia interface (HDMI), a universal serial bus (USB) interface, a secure digital (SD) card interface, or an audio interface.

A connecting terminal 178 may include a connector via which the electronic device 101 may be physically connected with the external electronic device 102. The connecting terminal 178 may include an HDMI connector, a USB connector, an SD card connector, and/or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include a motor, a piezoelectric element, and/or an electric stimulator.

The camera module 180 may capture a still image or moving images. The camera module 180 may include one or more lenses, image sensors, image signal processors, or flashes.

The power management module 188 may manage power supplied to the electronic device 101. The power management module 188 may be implemented as at least part of a power management integrated circuit (PMIC).

The battery 189 may supply power to at least one component of the electronic device 101. The battery 189 may include a primary cell which is not rechargeable, a secondary cell which is rechargeable, and/or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication.

The communication module 190 includes a wireless communication module 192 (e.g., a cellular communication module, a short-range wireless communication module, or a global navigation satellite system (GNSS) communication module) and a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., an international mobile subscriber identity (IMSI)) stored in the subscriber identification module 196.

The antenna module 197 may transmit or receive a signal or power to or from the outside (e.g., the external electronic device) of the electronic device 101. The antenna module 197 may include an antenna including a radiating element composed of a conductive material or a conductive pattern formed in or on a substrate (e.g., a printed circuit board (PCB)). The antenna module 197 may include a plurality of antennas. In such a case, at least one antenna appropriate for a communication scheme used in the communication network, such as the first network 198 or the second network 199, may be selected by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands and/or data may be transmitted or received between the electronic device 101 and the external electronic device 104 via the server 108 coupled with the second network 199. Each of the electronic devices 102 and 104 may be a device of a same type as, or a different type, from the electronic device 101.

All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
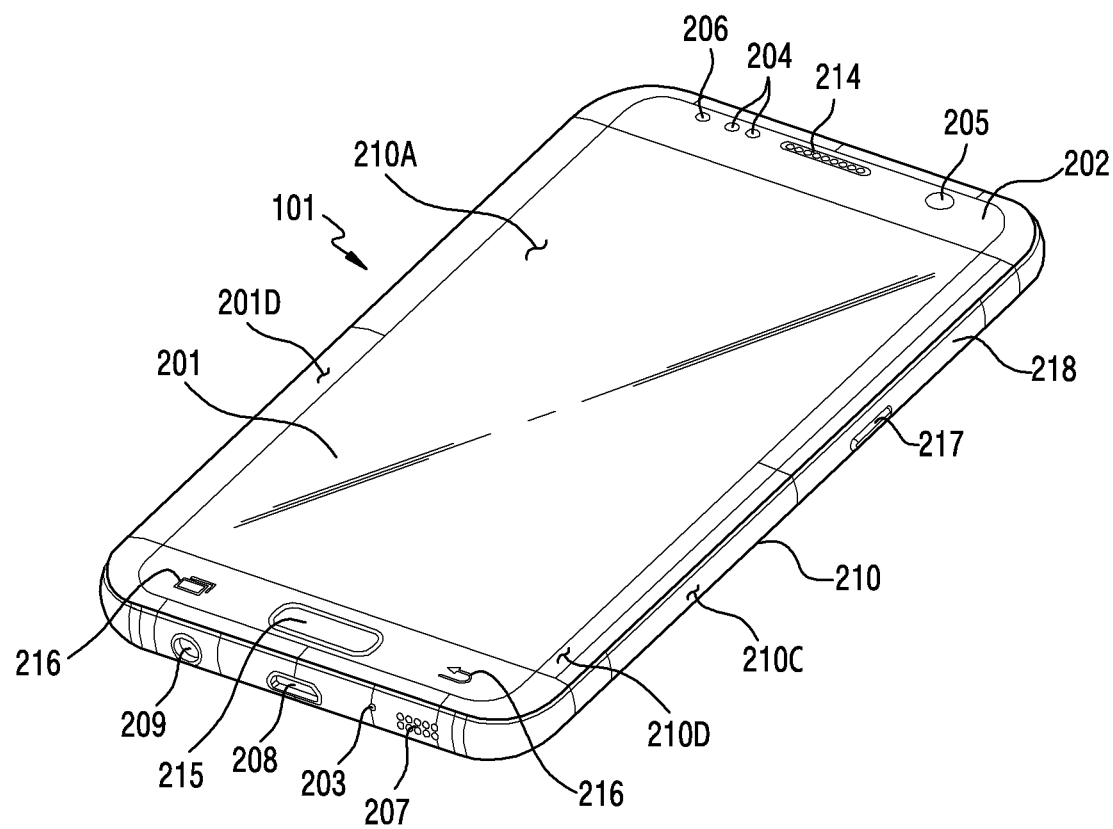
FIG. 2 illustrates a front surface of an electronic device according to an embodiment.

FIG. 2 illustrates a front surface of an electronic device according to an embodiment.

Figure 3:
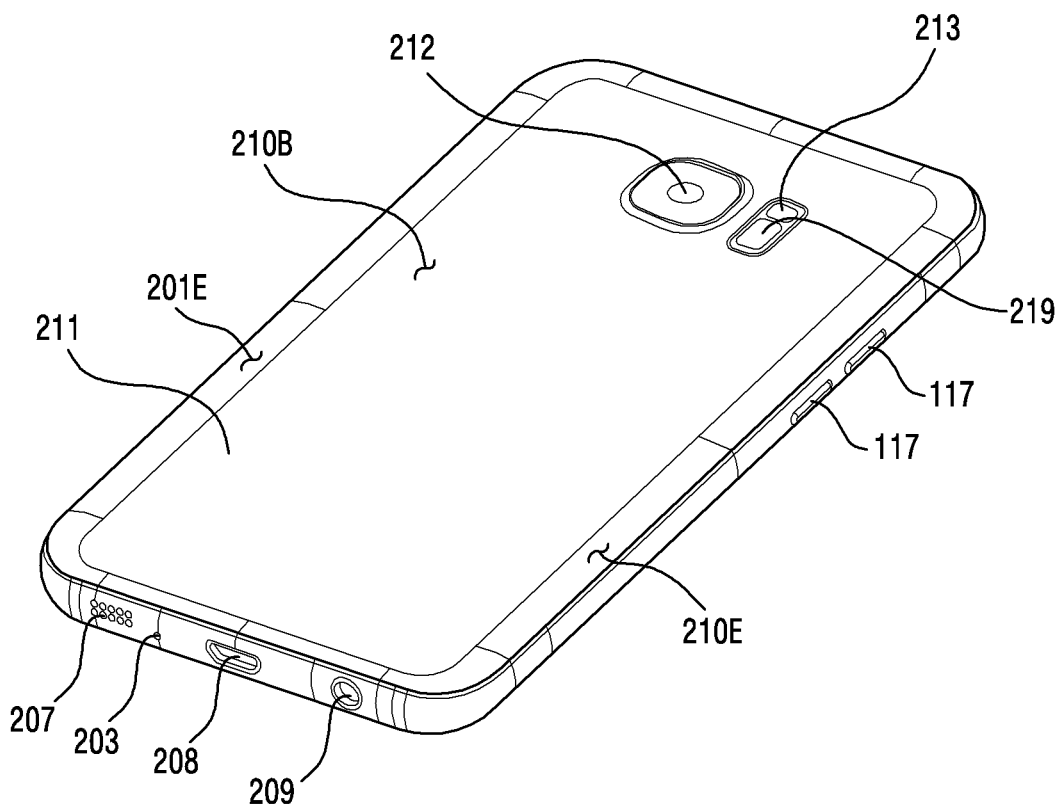
FIG. 3 illustrates a rear surface of an electronic device according to an embodiment.

FIG. 3 illustrates a rear surface of an electronic device according to an embodiment.

Referring to FIGS. 2 and 3, an electronic device 101 includes a housing 210 including a first surface (or a front surface) 210A, a second surface (a rear surface) 210B, and a side surface 210C that encloses the space between the first surface 210A and the second surface 210B. Alternatively, the housing may refer to a structure including some of the first surface 210A, the second surface 210B, and the side surfaces 210C of FIG. 2.

The first surface 210A includes a front surface plate 202, at least a part of which is substantially transparent, (e.g., a polymer plate or a glass plate including various coating layers). The second surface 210B includes a rear surface plate 211 that is substantially opaque. The rear surface plate 211 may include coated or colored glass, ceramic, polymer, metal (e.g., aluminum, stainless steel (STS), or magnesium), or a combination of at least two of the above materials. The side surface 210C includes a side surface bezel structure (or "a side surface member") 218, which is coupled with the front surface plate 202 and the rear surface plate 211 and includes metal and/or polymer. The rear surface plate 211 and the side surface bezel structure 218 may be integrally formed, and may include the same material (e.g., a metal material, such as aluminum).

The front surface plate 202 may have two first areas 210D bent and seamlessly extended from the first surface 210A toward the rear surface plate 211, which are included at both ends of long edges of the front surface plate 202.

Referring to FIG. 3, the rear surface plate 211 may have two second areas 210E bent and seamlessly extended from the second surface 210B toward the front surface plate 202, which are included at both ends of the long edges. The front surface plate 202 (or the rear surface plate 211) may include only one of the first areas 210D (or the second areas 210E). Alternatively, a part of the first areas 210D or a part of the second areas 210E may not be included. When viewed from the side of the electronic device 101, the side surface bezel structure 218 may have a first thickness (or width) on the side that includes neither the first areas 210D nor the second areas 210E, and may have a second thickness that is thinner than the first thickness on the side that includes either the first areas 210D or the second areas 210E.

The electronic device 101 includes display 201, audio modules 203, 207, and 214, sensor modules 204 and 219, camera modules 205, 212, and 213, key input devices 215, 216, and 217, an indicator 206, and connector holes 208 and 209. The electronic device 101 may omit at least one of elements (e.g., the key input devices 215, 216, and 217 or the indicator 206) or may further include another element.

The display 201 may be exposed through a part of the front surface plate 202. The display 201 may be exposed through the front surface plate 202 constituting the first areas 210D of the side surface 210C and the first surface 201A. The display 201 may be coupled or disposed adjacent to a touch sensing circuit, a pressure sensor capable of measuring the intensity (pressure) of a touch, and/or a digitizer that detects a stylus pen of a magnetic field type. At least a part of the sensor modules 204 and 219 and/or at least a part of the key input devices 215, 216, and 217 may be disposed in the first areas 210D and/or the second areas 210E.

The audio modules 203, 207, and 214 may include a microphone hole 203 and speaker holes 207 and 214. The microphone hole 203 may have inside a microphone for acquiring external sounds. Multiple microphones may be disposed in order to sense an orientation of sounds. The speaker holes 207 and 214 may include an external speaker hole 207 and a receiver hole 214 for a call. The speaker holes 207 and 214 and the microphone hole 203 may be implemented as one hole, or a speaker may be included without the speaker holes 207 and 214 (e.g., piezo speakers).

The sensor modules 204 and 219 may generate a data value or an electric signal corresponding to an external environment state or an internal operation state of the electronic device 101. The sensor modules 204 and 219 may include a first sensor module 204 (e.g., a proximity sensor) and/or a second sensor module (e.g., a fingerprint sensor) which are disposed on the first surface 210A of the housing 210, and/or a third sensor module 219 (e.g., an HRM sensor) disposed on the second surface 210B of the housing 210. The fingerprint sensor may be disposed on the second surface 210B as well as the first surface 210A (e.g., a home key button 215) of the housing 210. The electronic device 101 may further include other sensor modules, such as a gesture sensor, a gyro sensor, an air pressure sensor, a magnetic sensor, an acceleration sensor, a grip sensor, a color sensor, an IR sensor, a biometric sensor, a temperature sensor, a humidity sensor, and/or an illuminance sensor 204.

The camera modules 205, 212, and 213 may include a first camera device 205 disposed on the first surface 210A of the electronic device 101 and a second camera device 212 disposed on the second surface 210B of the electronic device 101, and/or a flash 213. The camera devices 205 and 212 may include one or multiple lenses, image sensors, and/or image signal processors. The flash 213 may include a light emitting diode (LED) or a xenon lamp. Two or more lenses (e.g., an infrared camera lens, a wide angle lens, and a telephoto lens) and image sensors may be disposed on one surface of the electronic device 101.

The key input devices 215, 216, and 217 may include a home key button 215 disposed on the first surface 210A of the housing 210, a touch pad 216 disposed near the home key button 215, and/or a side key button 217 disposed on the side surface 210C of the housing 210. The electronic device 101 may not include all or a part of the key input devices 215, 216, and 217 mentioned above, and the key input devices 215, 216, and 217, which are not included, may be implemented in a different form, such as a soft key on the display 201.

The indicator 206 may be disposed on the first surface 210A of the housing 210. The indicator 206 may provide state information of the electronic device 101 in an optical form, and may include an LED.

The connector holes 208 and 209 may include a first connector hole 208 capable of receiving a connector (e.g., a USB connector) for transceiving power and/or data with an external electronic device, and/or a second connector hole 209 (e.g., an earphone jack) capable of receiving a connector for transceiving an audio signal with an external electronic device.

Figure 4:
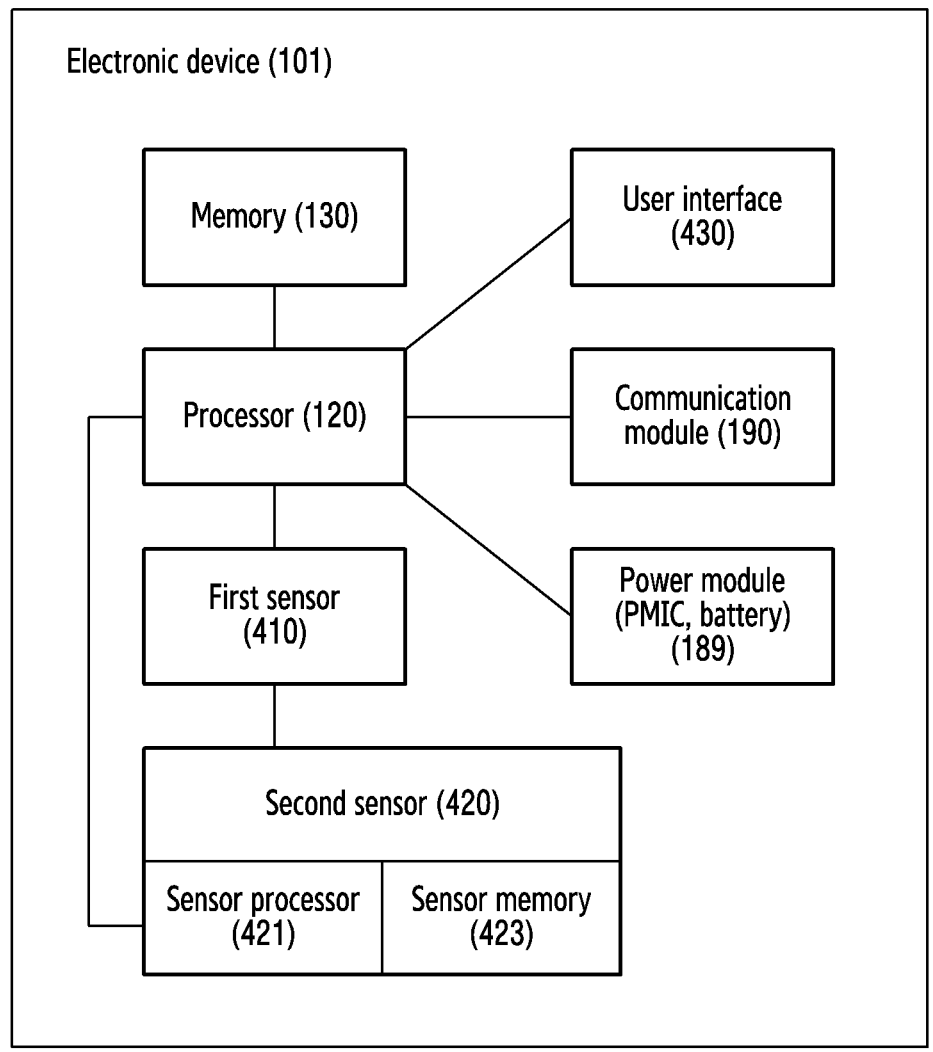
FIG. 4 illustrates an electronic device that senses external shocks according to an embodiment.

FIG. 4 illustrates an electronic device that senses external shocks according to an embodiment.

While the electronic device 101 illustrated in FIG. 4 may be the same as the electronic device 101 illustrated FIG. 1, for simplicity of description, FIG. 4 illustrates only elements necessary for description of the disclosure.

Referring to FIG. 4, the electronic device 101 includes a processor 120, a memory, 130, a communication module 190, a power supply module 189, a user interface 430, a first sensor 410, and a second sensor 420.

The communication module 190 may establish a direct (e.g., wired) communication channel or a wireless communication channel between the electronic device 101 and an external electronic device (e.g., an electronic device 102, an electronic device 104, or a server 408), and may support communication through the established channel. The communication module 190 may be operated independently of the processor 120 (e.g., an AP), and may include at least one CP that supports direct communication or wireless communication.

The power supply module 189 may support power to at least one element of the electronic device 101. The power supply module 189 may include a battery and a PMIC that can change external power into power required by the electronic device 101 and provide the changed power. The battery may include a non-rechargeable primary cell, a rechargeable secondary cell, or a fuel cell.

The memory 130 may store various data used by at least one element (e.g., the processor 120, the first sensor 410, or the second sensor 420) of the electronic device 101. The data may include software (e.g., a program 140) and input data or output data for a command relating thereto. The memory 130 may store information related to external shocks received by the electronic device 101.

The user interface 430 is a device capable of providing information to the outside of the electronic device 101 (e.g., a user), and may be the display device 160 illustrated in FIG. 1, such as a display, a hologram device, or a projector which can provide visual information, or may be a sound output device 155, such as a speaker or a receiver which can provide sound information. The user interface 430 may include a control circuit that controls a corresponding device.

The first sensor 410 may be a general acceleration sensor, a gyro sensor, or a six-axis sensor. The first sensor 410 may periodically measure (e.g., 500 Hz) data to sense movement of the electronic device 101, and may determine that there may be a shock on the basis of the measured data. When acceleration data measured for three axes (x, y, and z) is maintained to be less than or equal to 200 mG or when it is determined that the electronic device 101 rotates for a predetermined time or longer (e.g., a situation where even one axis among three axes of a gyro sensor is maintained over 500 dps (degree per second) for 6 ms (millisecond) or longer) occurs, the first sensor 410 may determine that the electronic device 101 may receive a shock and generate an event in order to activate the second sensor 420.

When the electronic device 101 falls, acceleration may increase rapidly. In a conventional acceleration sensor or a gyro sensor, which may correspond to the first sensor 410, because a shock of up to about 4G can be sensed, shock acceleration of 1000-2000 G, which may occur when the electronic device 101 receives a shock (e.g., a drop shock), cannot be measured. Therefore, if it is predicted, through measurement, that an acceleration of 4G or greater is to be instantaneously generated, the first sensor 410 may generate an event to activate the second sensor 420. When the event is generated, the first sensor 410 may transfer, to the second sensor 420, an indication that the event has been generated, by enabling an interrupt signal connected to the second sensor 420, in order to immediately activate the second sensor 420.

The first sensor 410 may determine that the event has ended, e.g., if it is determined that there are no more shocks after an initial shock is applied to the electronic device 101. The first sensor 410 may determine that the event has ended when a vector sum of the acceleration data measured for three axes is maintained at 0.8 G to 1.2 G for 10 ms or longer. When the first sensor 410 determines that the event has ended, the first sensor 410 may transfer, to the second sensor 420, an indication that the event has ended, by disabling the interrupt signal connected to the second sensor 420.

The second sensor 420 may be a high shock sensor having a measurement scale greater than that of a conventional acceleration sensor. The acceleration sensor may sense a shock of up to 4G, but a high shock sensor may sense a shock of up to 8000 G. For a shock due to drop, because a shock of 1000 G-2000 G may occur, an existing acceleration sensor cannot accurately sense the shock. Therefore, the second sensor 420 may be a type of sensor that accurately senses a shock that cannot be sensed using a conventional acceleration sensor.

The second sensor 420 includes a sensor processor 421 and a sensor memory 423. The sensor processor 421 of the second sensor 420 may be activated by an interrupt signal coming from the first sensor 410, and may control, during activation, elements within the second sensor 420 to measure and collect data relating to a shock. The sensor processor 421 of the second sensor 420 may store, in the sensor memory 423, the shock data measured during the activation, and then may transfer the stored shock data to the processor 120 at a time point of deactivation. The shock data may include information on the amount of shock measured at each sampling time.

Figure 5:
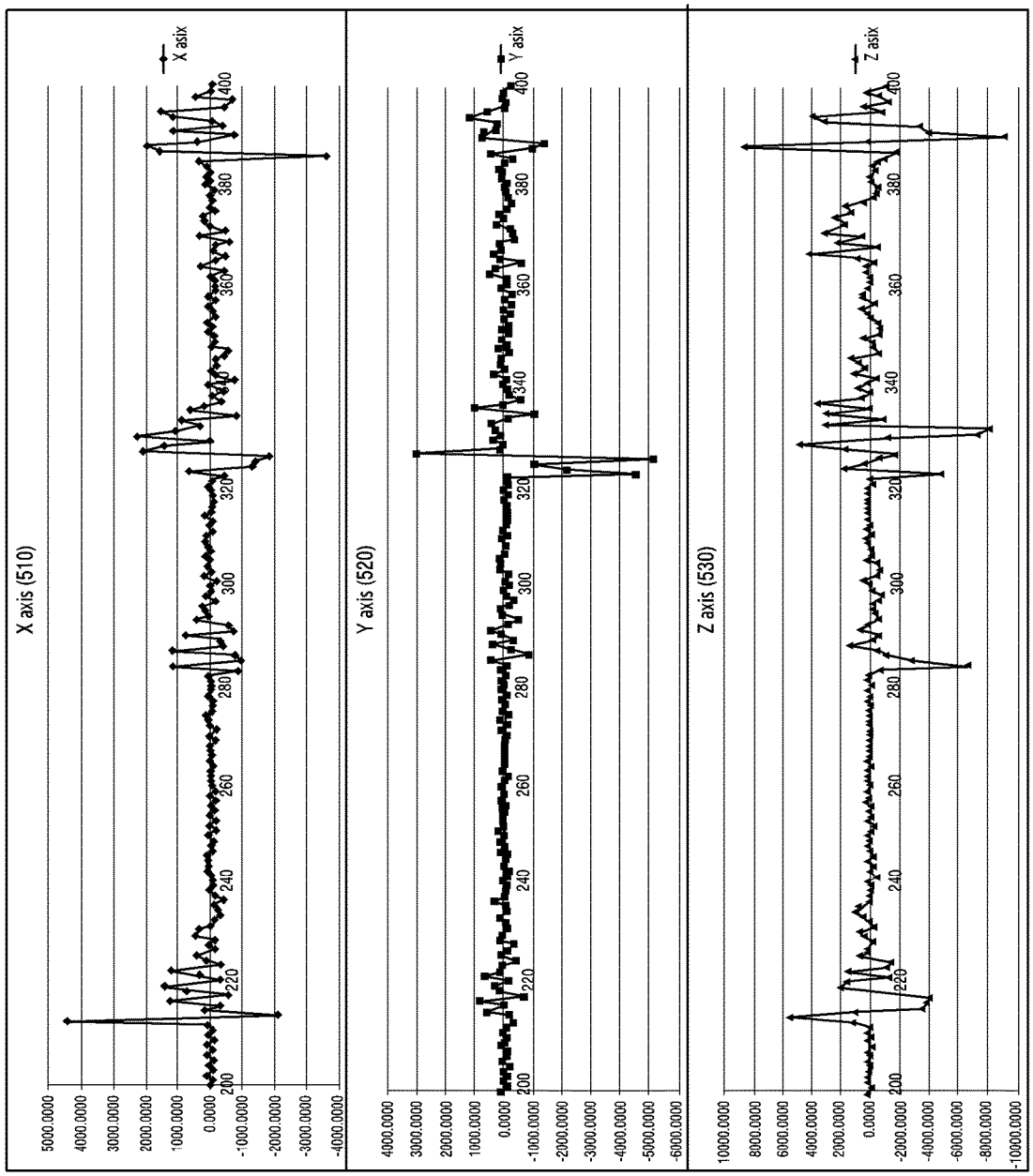
FIG. 5 illustrates an example of external shock data collected and transferred by a sensor according to an embodiment.

FIG. 5 illustrates an example of external shock data collected and transferred by a second sensor according to an embodiment.

Referring to FIG. 5, the second sensor 420 may measure and store information on an amount of shock at each of an x-axis 510, a y-axis 520, and a z-axis 530. The amount of shock applied to the x-axis 510, y-axis 520, and z-axis 530 is measured at each sampling time and stored in the sensor memory 423. When the second sensor 420 is deactivated, shock data stored in the sensor memory 423 may be transferred to the processor 120.

The sensor processor 421 of the second sensor 420 may integrate shock data, which is collected during the activation, with an absolute value, may calculate a total amount of shock occurred during a shock event, and may transfer a result thereof to the processor 120. The sensor processor 421 of the second sensor 420 may measure the amount of shock at a sampling time of a predetermined period, obtain an absolute value for a value of the measured amount of shock, and multiply the absolute value by the period, so as to determine the amount of shock in one period that is an interval between sampling times, and the total amount of shock may be calculated by adding the determined amount of shock during an event interval.

The processor 120 may control at least one other element (e.g., a hardware or software element) of the electronic device 101, which is connected to the processor 120, by executing, for example, software, and may perform various data processing or calculation. As at least a part of the data processing or calculation, the processor 120 may store, in a volatile memory 132, a command or data received from another element (e.g., the first sensor 410 or the second sensor 420), may process the command or data stored in the volatile memory 132, and may store result data in a non-volatile memory 134.

The processor 120 may analyze a shock pattern by using shock data received from the second sensor 420, as illustrated in FIG. 5. The processor 120 may analyze the shock data received from the second sensor 420 to derive a shock pattern, and may analyze a shock situation on the basis thereof. If only a small shock is sensed after one big shock based on a result of analyzing the shock data, the processor 120 may analyze the shock situation as a shock due to free fall. If it is analyzed that a shock of a predetermined magnitude or greater occurs several times, it may be analyzed that the electronic device 101 continuously receives a shock from the bottom after falling.

The processor 120 may use time data when analyzing the shock data. The processor 120 may analyze a shock start time and a shock end time, in order to determine that the electronic device 101 has fallen once when an interval between the start time and the end time is small and determine that the electronic device 101 continuously receives a shock after falling, when the interval between the start time and the end time is long.

The processor 120 may display an analysis result in the display device 160 to notify a user of the analysis result. The processor 120 may display the analysis result differently in the display device 160 according to the shock situation determined through the analysis, so that the user may be aware of what shock situation has occurred.

The processor 120 may accumulate and continuously store the amount of shock received by the electronic device 101, by using the total amount of shock and/or the shock data received from the second sensor 420, and then may provide a notification to a user. The processor 120 may notify the user to check a battery when the accumulated amount of shock is greater than or equal to a predetermined value.

Figure 6:
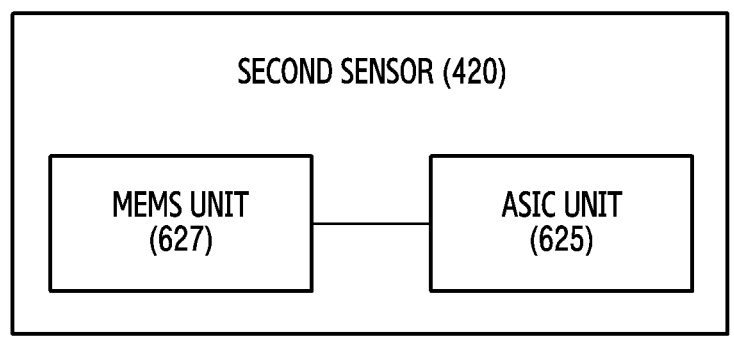
FIG. 6 illustrates a second sensor according to an embodiment.

FIG. 6 illustrates a second sensor according to an embodiment.

The term "unit" used hereinafter may refer to a unit for processing at least one function or operation and may be implemented in hardware, software, or a combination of hardware and software.

Referring to FIG. 6, the second sensor 420 includes a micro electro mechanical system (MEMS) unit 627 and an application specific integrated circuit (ASIC) unit 625. The ASIC unit 625 may include the sensor processor 421 and the sensor memory 423, e.g., as illustrated in FIG. 4.

In the MEMS unit 627, a change in the shape of an MEMS structure inside the sensor occurs according to acceleration transferred to the sensor, and a change in a value of a capacitor inside the sensor due to the change in the shape may be output as an analog signal. The MEMS structure inside the MEMS unit 627 is a three-dimensional structure, and may sense and output acceleration information for three dimensions of each of the x, y, and z axes.

The ASIC unit 625 may processes an analog signal output from the MEMS unit 627 into a digital signal recognizable by the processor 120 and transfer the processed digital signal to the processor 120. The ASIC unit 625 may change and process a measurement parameter, such as an acceleration measurement range, sensitivity, and a data transfer rate.

The ASIC unit 635 or the sensor processor 421 included in the ASIC unit may acquire shock information for each of the x, y, and z axes from the signal output from the MEMS unit 627. The MEMS unit 627 generally provides shock information for the x, y, and z axes, but is not limited thereto. The MEMS unit 627 may provide shock information of one axis, two axes, or four or more axes.

The ASIC unit 625 is not operated but is activated when an enabled interrupt signal is received from the first sensor 410, and then periodically performs sampling of a signal output from the MEMS unit 627. The sampling may be performed until a disabled interrupt signal is received from the first sensor 410. A sampling period may be 13 kHz or greater.

The shock sensor (second sensor 420) of FIG. 4 may include the ASIC unit 625 and the MEMS unit 627 of an IC type, and may be simply mounted on the electronic device 101 without a separate external part, so that it is possible to apply the shock sensor to a portable electronic device. Further, the MEMS unit 627 and the ASIC unit 625 may be combined in order to be implemented as a single module, and the shock sensor implemented as a single module may further reduce the size thereof.

According to an embodiment, an electronic device includes a housing; a first sensor located inside the housing and configured to monitor acceleration of a first range; a second sensor located inside the housing and configured to measure acceleration of a second range that is higher than the first range; a processor located inside the housing and operatively connected to the first sensor and the second sensor; and a memory located inside the housing and operatively connected to the processor. The memory is configured to store information related to external shocks on parts of the housing, the first sensor generates an event for activating the second sensor when the monitored acceleration is greater than or equal to the first range, and the memory stores instructions causing the processor to, when executed, acquire data due to the external shocks by using the activated second sensor, and store the acquired data and the information in the memory.

The instructions may cause the processor to analyze an external shock situation at least partially on the basis of the acquired data.

The electronic device may further include a user interface, and the instructions may cause the processor to provide information related to the external shock through the user interface.

The first sensor may be configured to transfer, to the second sensor, an interrupt signal for activation of the second sensor, and the second sensor may be configured to be activated at least partially on the basis of whether the received interrupt signal is enabled. The first sensor may be configured to enable the interrupt signal in a case where the monitored acceleration is greater than or equal to the first range, and the first sensor may be configured to disable the interrupt signal in a case where the monitored acceleration is less than the first range.

The monitored acceleration may be greater than or equal to the first range when the acceleration is maintained at or below 0.2 G (gravitational acceleration) for all three axes of x, y, and z, or when the electronic device rotates for a predetermined time period or longer.

The acceleration may be less than the first range when a time, in which a vector sum of acceleration data for the three axes of x, y, and z, which is monitored using the first sensor, is maintained within a range of 0.8 G to 1.2 G for 0.01 second or longer.

The second sensor may include an interrupt pin connected to the first sensor, a sensor processor coupled to the second sensor and configured to process data acquired from the second sensor, and a sensor memory coupled to the second sensor and configured to store the data.

The second sensor may include a MEMS unit that measures data due to the external shock and an ASIC unit including the sensor memory and the sensor processor. The sensor processor is activated when an interrupt signal input via the interrupt pin is enabled and, when activated, the sensor processor may periodically perform sampling of the data due to the external shock, which is output by the MEMS unit, and may store the sampled data in the sensor memory.

When the interrupt signal that is input via the interrupt pin is disabled, the sensor processor may be configured to transfer the data due to the external shock, which is stored in the sensor memory, to the processor and perform deactivation.

The sensor processor may store, in the sensor memory, at least one of data due to all external shocks measured at each sampling time, data having the greatest amount of shock from among the data due to all external shocks measured at each sampling time, and/or cumulative data obtained by accumulating the data due to all external shocks measured at each sampling time.

The instructions may be configured to cause the processor to configure the first sensor to monitor the acceleration at a first period, and to configure the second sensor to acquire the data at a second period that is shorter than the first period.

The instructions may be configured to cause the processor to, when the electronic device 101 momentarily receives a shock of a predetermined level or higher, provide, via the user interface, at least one among notification information indicating that there may be abnormality in the electronic device and notification information for recommendation of checking parts of the housing, which are related to the external shock.

The instructions may be configured to cause the processor to, when a cumulative shock amount obtained by accumulating previous shock data is greater than or equal to a configured threshold value, provide notification information by using the user interface.

The instructions may be configured to cause the processor to, when cumulative shock amounts for respective parts of the housing are greater than or equal to the configured threshold value, provide information related to the external shock for the parts of the housing by using the user interface.

The instructions may cause the processor to display the information related to the external shock in the form of a pop-up notification or a notification bar by using the user interface.

Figure 7:
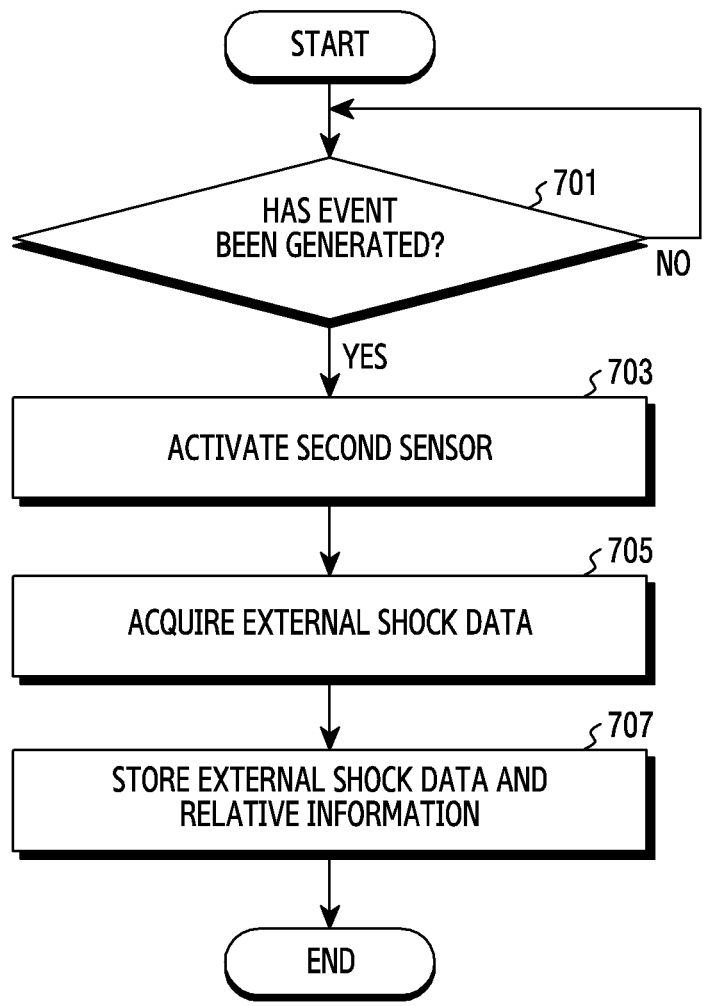
FIG. 7 is a flowchart illustrating operations of an electronic device that senses external shocks according to an embodiment.

FIG. 7 is a flowchart illustrating operations of the electronic device 101 that senses external shocks according to an embodiment. Although the operations of FIG. 7 are described below as being performed by the electronic device 101 or an element (e.g., the processor 120, the first sensor 410, and/or the second sensor 420) of the electronic device 101, the disclosure is not limited thereto.

Referring to FIG. 7, in step 701, the electronic device 101 measures acceleration by using the first sensor 410 in order to determine whether an event has occurred or not. Acceleration information may be for each of the x, y, and z axes, and the electronic device 101 may measure the acceleration information at a predetermined period e.g., the first period, 500 Hz. The electronic device 101 may determine that there may be a shock when the measured acceleration is out of a configured first range. If the measured acceleration data is maintained at or below 200 mG for all three axes of x, y, and z, it is determined that the electronic device 101 rotates for at least a predetermined time, such as when even one axis among three axes of a gyro sensor is maintained over 500 dps for 6 ms or longer, or when the measured acceleration rapidly increases, an event may be generated when it is determined that the electronic device 101 may receive a shock.

In step 703, after the event is generated in step 701, the electronic device 101 activates the second sensor 420 to acquire external shock data.

In step 705, the electronic device 101 acquires the external shock data by using the activated second sensor 420. The external shock data may include information on the amount of shock measured at a sampling time. The sampling time may be repeated at an identical period (e.g., a second period, 13 kHz) while the event is being generated.

The shock data may include information of the shock amount specific to each of the x, y, and z axes. The shock data may include a value represented by a vector sum of the shock amounts of respective axes. The shock data may be the largest amount of shock from among the amounts of shocks measured during generation of the event. The transferred shock data may be a cumulative shock amount obtained by accumulating all shocks received during the generation of the event.

In step 707, the electronic device 101 stores, in the memory 130, the external shock data acquired using the second sensor 420 and information related to the external shocks on parts of the housing 210 of the electronic device 101, which may be acquired from the shock data. The electronic device 101 may divide the housing 210 of the electronic device 101 into multiple divided areas, and may determine which divided area of the housing has received a shock, based on the external shock data acquired using the second sensor 420. The electronic device 101 may store the shock data and information related to the external shocks on the parts of the housing 210, which is determined based on the shock data.

As described above, in the electronic device 101, the first sensor 410 determines whether an event is generated, and then the second sensor 420 is activated by the generated event to collect the shock data, in order to sense a shock received by the electronic device 101.

Figure 8:
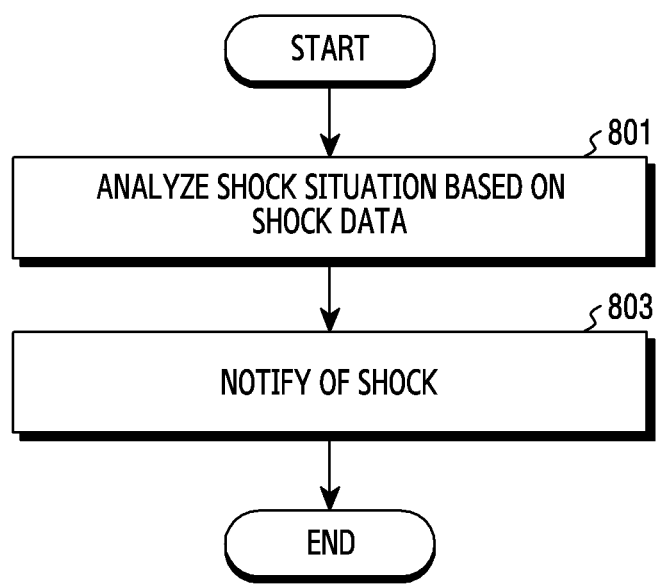
FIG. 8 is a flowchart illustrating analysis and notification operations of an electronic device that senses external shocks according to an embodiment.

FIG. 8 is a flowchart illustrating analysis and notification operations of an electronic device that senses external shocks according to an embodiment.

Referring to FIG. 8, in step 801, the electronic device 101 analyzes a shock situation based on shock data additionally stored in the memory 130. The electronic device 101 may analyze a shock pattern by using the shock data which is stored in the memory 130 or transferred from the second sensor 420. The electronic device 101 may analyze the shock situation based on the analyzed shock pattern. If only a small shock that is less than or equal to a preconfigured value is sensed after one big shock, the electronic device 101 may analyze the shock situation as a shock due to free fall. However, if it is analyzed that a shock of a predetermined magnitude or greater occurs several times, it may be analyzed that the electronic device 101 continuously receives a shock from the bottom after falling. The electronic device 101 may analyze a shock start time and a shock end time, in order to determine that the electronic device 101 has fallen once when an interval between the start time and the end time is small and determine that the electronic device 101 continuously receives a shock after falling when the interval between the start time and the end time is long.

In step 803, the electronic device 101 displays, in the user interface 430, information indicating that the electronic device 101 has received a shock, in order to notify a user of the information. When a shock of a configured threshold value or greater is received momentarily, the electronic device 101 may provide a notification that the electronic device 101 may have abnormality, to the user via the user interface 430. When the measured amount of shock is greater than or equal to a configured threshold value, the electronic device 101 may provide a notification for recommending the user to check a specific part. When a cumulative shock amount obtained by accumulating the previous amounts of shocks is greater than or equal to a configured threshold value, the electronic device 101 may display the cumulative shock amount in the user interface 430 in order to notify the user of the same. The electronic device 101 may provide a notification to the user in the form of a pop-up, in the form of display in a notification bar, or in the form of sound generation by a sound output device 155.

Figure 9:
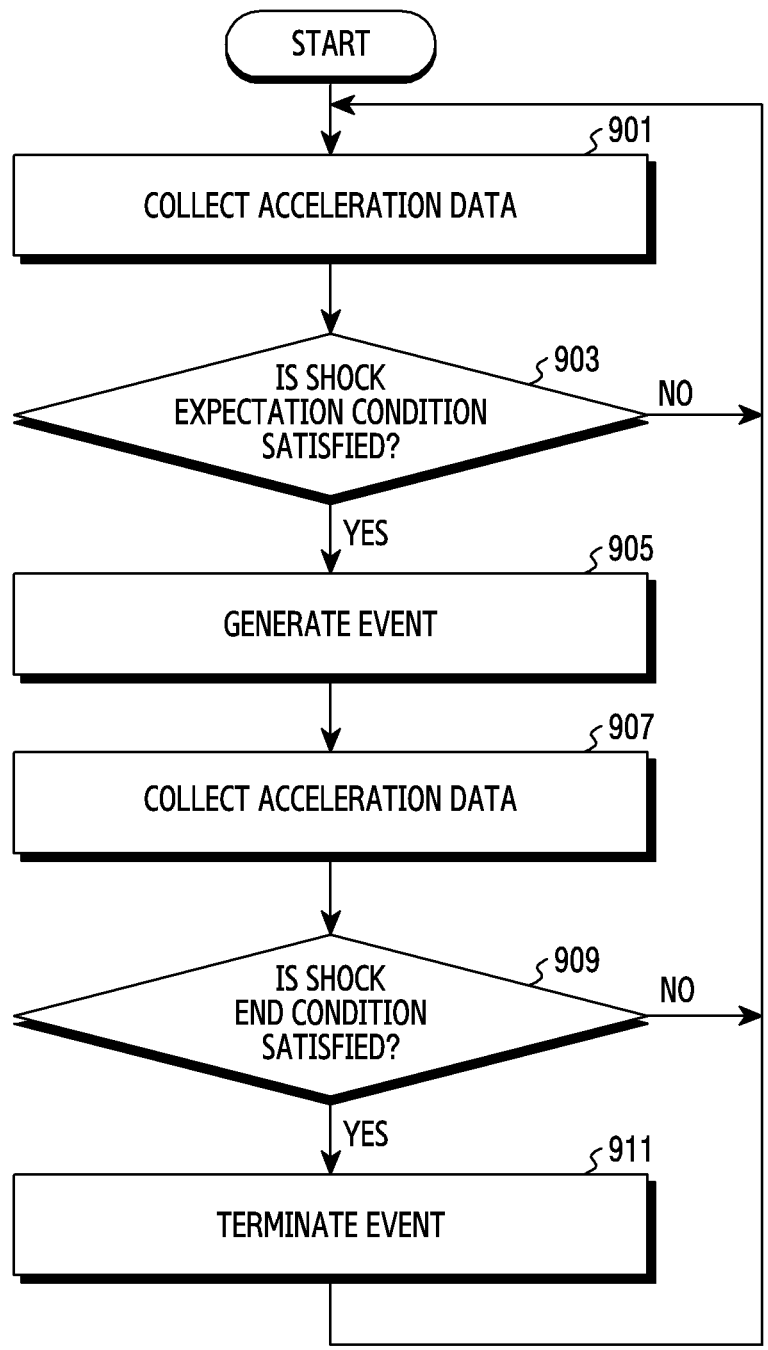
FIG. 9 is a flowchart illustrating operations of an electronic device that generates an event for predicting external shocks according to an embodiment.

FIG. 9 is a flowchart illustrating operations of an electronic device that generates an event for predicting external shocks according to an embodiment. Although the operations of FIG. 9 are described below as being performed by the electronic device 101 or an element (e.g., the first sensor 410) of the electronic device 101, the disclosure is not limited thereto.

The first sensor 410 may include at least one of an acceleration sensor or a gyro sensor.

Referring to FIG. 9, in step 901, the electronic device 101 (e.g., the first sensor 410) collects acceleration data. The first sensor 410 that collects the acceleration data may always be activated, and may collect the acceleration data at a first period greater than or equal to 500 Hz or less than or equal to 2 ms.

In step 903, the electronic device 101 analyzes the collected acceleration data and determines whether a condition, in which an external shock is expected, is satisfied.

If satisfied, the electronic device 101 generates an event in step 905. The condition in which an external shock is expected may include when acceleration data monitored by the first sensor 410 of the electronic device 101 is greater than or equal to a first range.

Even after generation of the event, the electronic device 101 continuously collects acceleration data in step 907, and determines, in step 909, whether a condition indicating that the external shock has ended is satisfied. If the condition is not satisfied, the electronic device 101 continuously collects the acceleration data in step 901, and determines whether the collected acceleration data satisfies the condition. If the condition indicating that the external shock has ended is satisfied in step 909, the generated event is terminated in step 911. The condition indicating that the external shock has ended may include the acceleration data monitored by the first sensor 410 of the electronic device 101 being less than or equal to the first range.

The generation and termination of the event may be represented by an interrupt signal. If the interrupt signal is logic 1 (high), the signal may indicate that the event has been generated, and if the interrupt signal is logic 0 (low), the signal may indicate that the event has not been generated or has ended.

Figure 10:
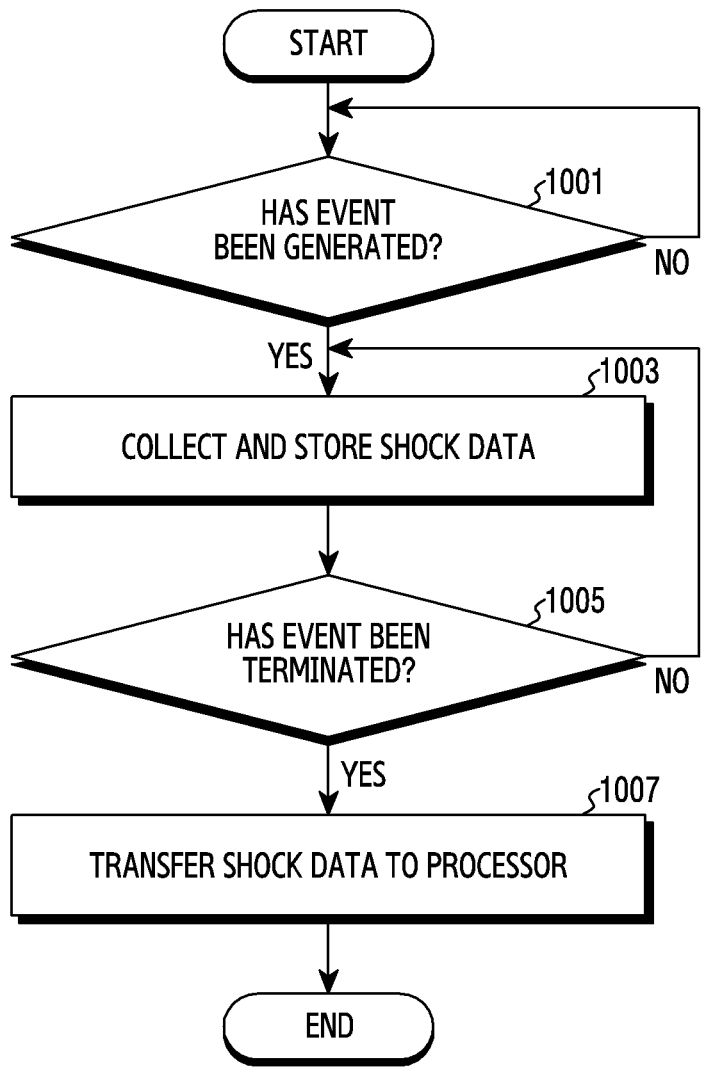
FIG. 10 is a flowchart illustrating operations of an electronic device that generates an event and then collects external shock data according to an embodiment.

FIG. 10 is a flowchart illustrating operations of an electronic device that generates an event and then collects external shock data according to an embodiment. Although the operations of FIG. 10 are described below as being performed by the electronic device 101 or an element (e.g., the second sensor 420) of the electronic device 101, the disclosure is not limited thereto.

The second sensor 420 may be a high shock sensor capable of sensing a gravity acceleration of a large scale up to 8000 G.

Referring to FIG. 10, in step 1001, the electronic device 101 (e.g., the second sensor 420) checks whether an event is generated. The second sensor 420 of the electronic device 101 may be deactivated until an event is generated or occurs, in order to reduce power consumed by the electronic device 100.

The second sensor 420 of the electronic device 101 may determine whether an event has occurred, according to an interrupt signal. If the interrupt signal is logic 1 (high), the electronic device 101 may determine that the event has been generated, and if the interrupt signal is logic 0 (low), the electronic device 101 may determine that the event has not been terminated. Alternatively, if the interrupt signal is logic 0 (low), the electronic device 101 may determine that the event has been generated, and if the interrupt signal is logic 1 (high), the electronic device 101 may determine that the event has not been terminated. If it is determined that the event has occurred, the second sensor 420 may be switched from a deactivated state to an activated state.

In step 1003, the second sensor 420 of the electronic device 101, which has been switched to the activated state, collects and stores shock data. The second sensor 420 of the electronic device 101 may collect the shock data at each sampling time of a second period greater than or equal to 13 kHz or less than or equal to 76.9 us. The collected shock data may be temporarily stored in the sensor memory 423 of the second sensor 420. The second sensor 420 may store all shock data measured at each sampling time in the sensor memory 423. The magnitudes of shock data measured at respective sampling times may be compared, and data having a greatest shock amount may be stored as shock data. A cumulative shock amount obtained by accumulating the shock data measured at each sampling time may be stored as the shock data.

In step 1005, the electronic device 101 determines whether the event has been terminated. As described above, because the generation and termination of the event may be represented by the interrupt signal driven by the first sensor 410, the electronic device 101 may determine that the event has been terminated if the interrupt signal is switched to a signal (which may be logic 1 or logic 2) indicating that the event has been terminated.

When the event is terminated in step 1005, the second sensor 420 (e.g., the sensor processor 421 of FIG. 4) transfers the shock data to the processor 120 in step 1007. The transferred shock data may be shock data stored in the sensor memory 423 during generation of the event.

Accordingly, the second sensor 420 (e.g., the sensor processor 421 of FIG. 4) of the electronic device 101 may transfer the shock data to the processor 120 after termination of the event, and then may return to the deactivated state.

Figure 11:
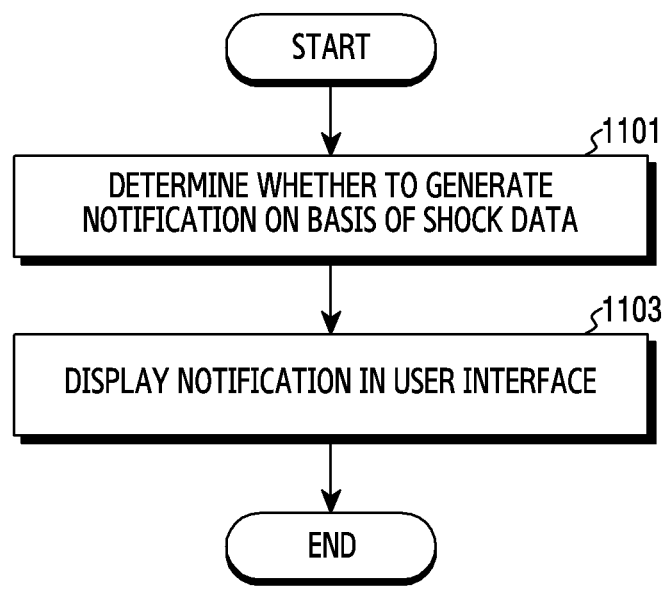
FIG. 11 is a flowchart illustrating operations of an electronic device that displays a notification in a display device according to an embodiment.

FIG. 11 is a flowchart illustrating operations of an electronic device that displays a notification according to an embodiment. Although the operations of FIG. 11 are described below as being performed by the electronic device 101 or an element (e.g., the processor 120) of the electronic device 101, the disclosure is not limited thereto.

Referring to FIG. 11, in step 1101, the electronic device 101 (e.g., the processor 120) determines whether to generate a notification, based on the shock data. When a shock of a configured threshold value or greater is received momentarily, or when a cumulative shock amount obtained by accumulating previous shock amounts is greater than or equal to a configured threshold value, the electronic device 101 may determine that a notification should be generated.

The processor 180 may provide a notification of a shock based on multiple levels of criteria. If the momentary amount of shock is 1000 G or greater, the processor 120 may determine that a notification for a housing 210 including glass and the display device 160 should be generated. When the amount of shock is 2000 G or greater, the processor 120 may determine that notifications for parts, such as a communication antenna module, a camera lens, a sensor, etc., should be generated. When the amount of shock is 3000 G or greater, the processor 120 may determine that notifications for a main board and a battery should be generated.

In step 1103, the electronic device 101 displays a notification in the user interface 430. Therefore, the electronic device 101 may provide a notification to a user through the user interface 430. The electronic device 101 may display, in the display device 160, a notification in the form of a pop-up or in the form of display in a notification bar. The electronic device 101 may output a notification in the form of sound to the sound output device 155.

Figure 12:
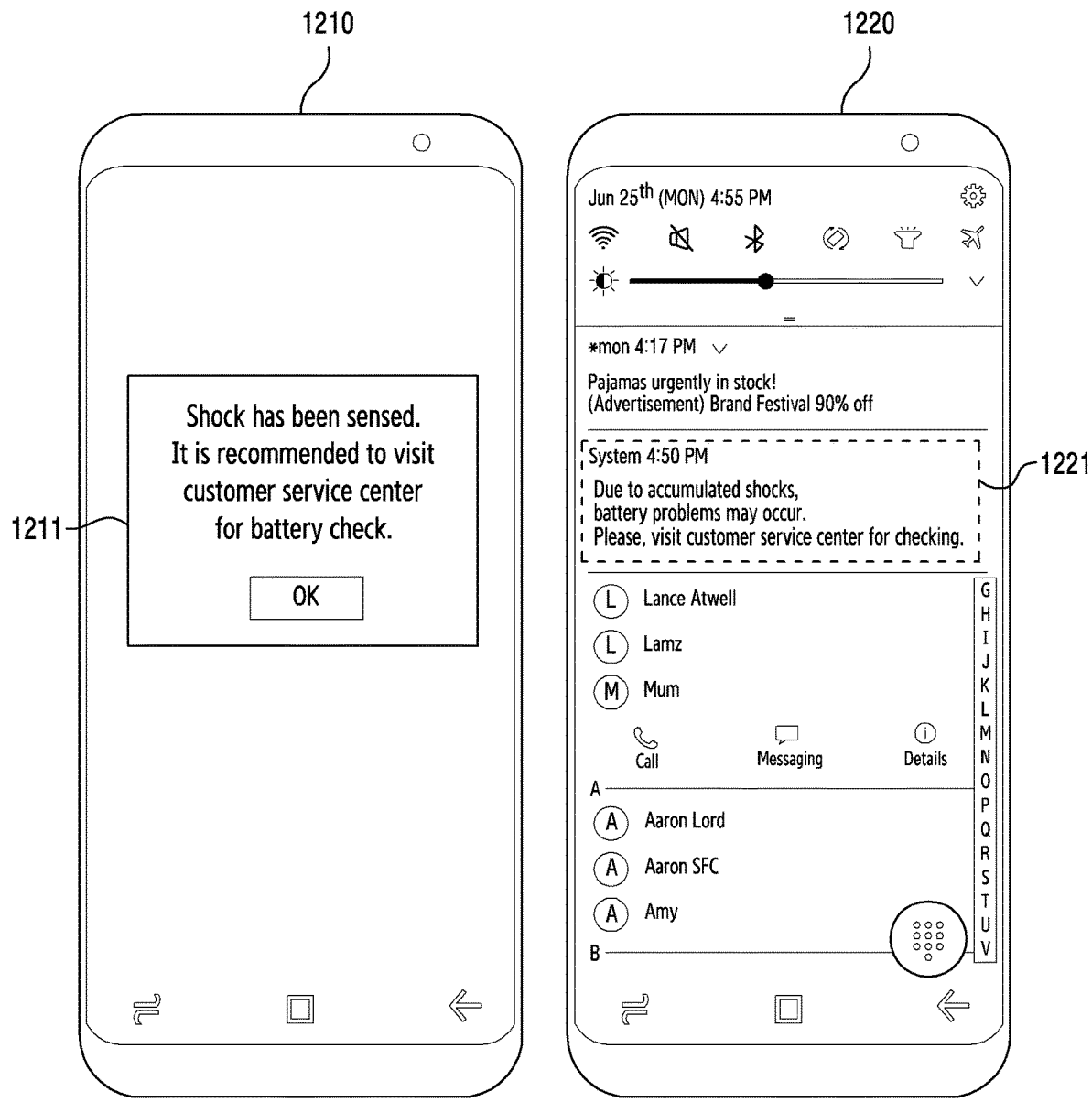
FIG. 12 illustrates an electronic device displaying a notification according to an embodiment.

FIG. 12 illustrates an electronic device displaying a notification, according to an embodiment.

Referring to FIG. 12, when a shock of a configured threshold value or greater is received momentarily, the processor 120 of the electronic device 101 may display that the electronic device 101 may have abnormality, in the form of a pop-up 1211 in the display device 160 in order to provide a notification to a user, as illustrated in 1210 of FIG. 12. When the measured amount of shock is greater than or equal to a configured threshold value, the processor 120 may display, in the display device 160, a notification in the form of the pop-up 1211 to recommend the user to check a specific part.

The processor 120 may provide a notification to the user based on a cumulative shock amount. When the cumulative amount of previous shocks, other than one shock, is greater than or equal to the configured threshold value, the processor 120 may display 1221 a notification in a notification bar of the display device 160, as illustrated in 1220 of FIG. 12.

According to an embodiment, a method of an electronic device includes monitoring acceleration by using a first sensor; generating an event based on the monitored acceleration; activating a second sensor by the event; acquiring data due to external shocks by using the activated second sensor; and storing the acquired data and information related to the external shocks on parts of a housing of the electronic device.

The operation method of the electronic device may further include analyzing an external shock situation at least partially on the basis of the acquired data; and providing the information related to the external shock through a user interface at least partially on the basis of the acquired data.

Generating the event based on the monitored acceleration includes determining whether the monitored acceleration is greater than or equal to a first range; generating the event when the monitored acceleration is greater than or equal to the first range on the basis of the determination; after the event is generated, determining whether the monitored acceleration is less than or equal to the first range; and terminating the event when the monitored acceleration is less than or equal to the first range on the basis of the determination.

When the event has occurred, acquiring the shock data due to the external shock by activating the second sensor includes determining whether the event has occurred; when the event has occurred, on the basis of the determination, activating the second sensor, collecting shock data by using the second sensor, and storing the collected shock data in a memory within the second sensor; determining whether the event has been terminated; and when the event has been terminated, based on the determination, transferring the shock data stored in the memory within the second sensor to a processor.

Providing the information related to the external shock through the user interface based on the acquired data may include at least one among, when the electronic device momentarily receives a shock of a predetermined level or higher, providing, via the user interface, notification information indicating that the electronic device may have abnormality and/or notification information for recommendation of checking parts of the housing, which are related to the external shock; when a cumulative shock amount obtained by accumulating previous shock data is greater than or equal to a configured threshold value, providing a notification via the user interface; and if the cumulative shock amounts of respective parts of the housing are greater than or equal to a configured threshold value, providing the information related to the external shock on the parts of the housing via the user interface.

The disclosure provides various embodiments for sensing shocks by an electronic device.

The disclosure provides a method and a device capable of collecting shock data more precisely while minimizing power consumption, by using at least one of the various embodiments described herein.

Based on the various embodiments described in the disclosure, a user may be able to take an action in advance to receive a post service, by providing the user with a notification that the electronic device may have abnormality due to an external shock.

An electronic device according to an embodiment may be one of various types of electronic devices, e.g., a portable communication device (e.g., a smartphone), a computer device, a portable multimedia device, a portable medical device, a camera, a wearable device, or a home appliance. However, the electronic devices are not limited to those described above.

The various embodiments of the present disclosure and the terms used therein are not intended to limit the technological features set forth herein to particular embodiments and include various changes, equivalents, or replacements for a corresponding embodiment.

With regard to the description of the drawings, similar reference numerals may be used to refer to similar or related elements.

A singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases.

Numerical terms, such terms as "1st" and "2nd," or "first" and "second" may be used to simply distinguish a corresponding component from another, and do not limit the components in other aspect (e.g., importance or order).

If an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an ASIC.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. According to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been particularly shown and described with reference to certain embodiments thereof, it will be understood by those of ordinary skill in the art that various changes in form and details may be made therein without departing from the spirit and scope of the disclosure as defined by the following claims and their equivalents.

What is claimed is:

1. An electronic device, comprising:
a housing;
a first sensor configured to monitor acceleration within a first range;
a second sensor configured to measure acceleration within a second range that is higher than the first range;
a processor operatively connected to the first sensor and the second sensor; and
a memory operatively connected to the processor,
wherein the first sensor is further configured to generate an event for activating the second sensor when a monitored acceleration is greater than or equal to a maximum of the first range, and
wherein the memory is configured to:
store information related to external shocks on parts of the housing,
store instructions, which when executed, cause the processor to acquire data due to the external shocks by using the activated second sensor, and
store the acquired data with the information related to the external shocks in the memory.

2. The electronic device of claim 1, wherein the instructions, when executed, cause the processor to analyze an external shock situation based on the acquired data.

3. The electronic device of claim 1, further comprising a user interface,
wherein the instructions, when executed, cause the processor to provide the information related to the external shocks, via the user interface.

4. The electronic device of claim 3, wherein the instructions, when executed, cause the processor to provide, via the user interface, when the electronic device receives an external shock of at least a predetermined level, at least one among first notification information indicating that the electronic device may have an abnormality, and second notification information for recommendation of checking parts of the electronic device, which are related to the external shock.

5. The electronic device of claim 4, wherein the instructions, when executed, cause the processor to, if a cumulative shock amount for respective parts of the electronic device is greater than or equal to a threshold value, provide information related to the external shock for the parts of the electronic device, via the user interface.

6. The electronic device of claim 3, wherein the instructions, when executed, cause the processor to, when a cumulative shock amount obtained by accumulating previous shock data is greater than or equal to a threshold value, provide notification information via the user interface.

7. The electronic device of claim 3, wherein the instructions, when executed, cause the processor to display the information related to the external shocks in the form of a pop-up notification or in the form of a notification bar via the user interface.

8. The electronic device of claim 1, wherein the first sensor is further configured to transfer, to the second sensor, an interrupt signal for activating the second sensor, and
wherein the second sensor is further configured to activate based on whether the received interrupt signal is enabled.

9. The electronic device of claim 8, wherein the first sensor is further configured to:
enable the interrupt signal in response to the monitored acceleration being greater than or equal to the maximum of the first range, and
disable the interrupt signal in response to the monitored acceleration being less than the maximum of the first range.

10. The electronic device of claim 9, wherein the monitored acceleration is greater than or equal to the maximum of the first range when accelerations for x, y, and z axes of the electronic device are maintained at or below 0.2 G (gravitational acceleration) or when the electronic device rotates for a predetermined time.

11. The electronic device of claim 9, wherein the monitored acceleration is less than the maximum of the first range when a time, in which a vector sum of accelerations for x, y, and z axes of the electronic device, which are monitored using the first sensor, are within a range of 0.8 G to 1.2 G and maintained for at least 0.01 second.

12. The electronic device of claim 1, wherein the second sensor comprises:
an interrupt pin connected to the first sensor;
a sensor processor coupled to the second sensor and configured to process data acquired from the second sensor; and
a sensor memory coupled to the second sensor and configured to store the processed data.

13. The electronic device of claim 12, wherein the second sensor further comprises:
a micro electro mechanical system (MEMS) configured to measure data due to the external shocks; and an application specific integrated circuit (ASIC) including the sensor memory and the sensor processor, wherein the sensor processor is activated when an interrupt signal input via the interrupt pin is enabled, and wherein when the sensor processor is activated, the sensor processor periodically performs sampling of data, which is output by the MEMS, due to the external shocks, and stores the sampled data in the sensor memory.

14. The electronic device of claim 13, wherein the sensor processor is further configured to, when the interrupt signal input via the interrupt pin is disabled, transfer the data due to the external shocks, which is stored in the sensor memory, to the processor and deactivate the sensor processor.

15. The electronic device of claim 13, wherein the sensor processor stores, in the sensor memory, at least one of data due to all external shocks measured at each sampling time, data having a largest amount of shock from among the data due to all external shocks measured at each sampling time, and cumulative data obtained by accumulating the data due to all external shocks measured at each sampling time.

16. The electronic device of claim 1, wherein the instructions, when executed, cause the processor to:
configure the first sensor to monitor acceleration at a first period; and
configure the second sensor to acquire the data at a second period that is shorter than the first period.

17. A method of an electronic device, the method comprising:
monitoring acceleration using a first sensor;
generating an event based on the monitored acceleration;
activating a second sensor based on the event;
acquiring data due to external shocks on parts of the electronic device by using the activated second sensor; and
storing the acquired data and information related to the external shocks.

18. The method of claim 17, wherein generating the event based on the monitored acceleration comprises:
determining whether the monitored acceleration is greater than or equal to a maximum of a first range;
generating the event when it is determined that the monitored acceleration is greater than or equal to the maximum of the first range; and
after the event is generated, determining whether the monitored acceleration is less than the maximum of the first range; and
terminating the event when it is determined that the monitored acceleration is less than the maximum of the first range.

19. The method of claim 17, further comprising:
analyzing an external shock situation based on the acquired data; and
providing the information related to the external shocks via a user interface based on the acquired data.

20. The method of claim 19, wherein providing the information related to the external shocks via the user interface based on the acquired data comprises at least one of:
when the electronic device momentarily receives a shock of at least a predetermined level, providing, via the user interface, at least one of first notification information indicating that the electronic device may have an abnormality and second notification information for recommendation of checking parts of the electronic device, which are related to the external shocks;
when a cumulative shock amount obtained by accumulating previous shock data is greater than or equal to a first threshold value, providing a notification via the user interface; and
when the cumulative shock amount for respective parts of the electronic device is greater than or equal to a second threshold value, providing information related to the external shocks for the parts of the electronic device via the user interface.

* * * * *